(12) United States Patent
Iizuka

(10) Patent No.: US 11,008,974 B2
(45) Date of Patent: May 18, 2021

(54) PISTON FOR INTERNAL COMBUSTION ENGINES AND METHOD FOR PRODUCING PISTON FOR INTERNAL COMBUSTION ENGINES

(71) Applicant: ISUZU MOTORS LIMITED, Tokyo (JP)

(72) Inventor: Tateoki Iizuka, Tokyo (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 16/069,528

(22) PCT Filed: Jan. 5, 2017

(86) PCT No.: PCT/JP2017/000103
§ 371 (c)(1),
(2) Date: Jul. 12, 2018

(87) PCT Pub. No.: WO2017/122564
PCT Pub. Date: Jul. 20, 2017

(65) Prior Publication Data
US 2019/0024605 A1   Jan. 24, 2019

(30) Foreign Application Priority Data

Jan. 12, 2016  (JP) .............................. JP2016-003509

(51) Int. Cl.
*F02F 3/00* (2006.01)
*F02F 3/14* (2006.01)
(Continued)

(52) U.S. Cl.
CPC ............ *F02F 3/14* (2013.01); *B22D 19/0027* (2013.01); *B23P 15/10* (2013.01); *F02F 3/12* (2013.01);
(Continued)

(58) Field of Classification Search
CPC . F02F 3/14; F02F 3/12; F02F 2200/06; B22D 19/0027; B23P 15/10; F16J 1/01; C25D 11/04; F05C 2253/12123
(Continued)

(56) References Cited

U.S. PATENT DOCUMENTS 4,587,177 A * 5/1986 Toaz ................... B22D 19/0027
428/610
5,146,883 A * 9/1992 Reipert ..................... F02F 3/10
123/193.6
(Continued)

FOREIGN PATENT DOCUMENTS

EP        0459546 A1    12/1991
JP        61-294159 A   12/1986
(Continued)

OTHER PUBLICATIONS

International Search Report from International Application No. PCT/JP2017/000103 dated Mar. 7, 2017.
(Continued)

*Primary Examiner* — Hung Q Nguyen
*Assistant Examiner* — Anthony Donald Taylor, Jr.
(74) *Attorney, Agent, or Firm* — Brundidge & Stanger, P.C.

(57) ABSTRACT

This piston for internal combustion engines, which is capable of achieving high heat shielding properties and high durability, comprises: a base that is formed from aluminum or an aluminum alloy; a composite material part which is formed in a first region of the surface of the base, and which is formed from a composite material that is reinforced with inorganic fibers or whiskers; and an alumite coating film that is formed on the composite material part and a second region of the surface of the base, said second region being different from the first region.

8 Claims, 3 Drawing Sheets

(51) Int. Cl.
*F16J 1/01* (2006.01)
*F02F 3/12* (2006.01)
*B22D 19/00* (2006.01)
*B23P 15/10* (2006.01)
*C25D 11/04* (2006.01)

(52) U.S. Cl.
CPC ............... *F16J 1/01* (2013.01); *C25D 11/04* (2013.01); *F02F 2200/06* (2013.01); *F05C 2253/12* (2013.01)

(58) Field of Classification Search
USPC ........................................................ 123/193.6
See application file for complete search history.

(56) References Cited

U.S. PATENT DOCUMENTS

| | | | | |
|---|---|---|---|---|
| 5,884,600 A | * | 3/1999 | Wang | ............... C25D 11/18 123/193.6 |
| 6,427,579 B1 | | 8/2002 | Sasaki | |
| 6,432,557 B2 | * | 8/2002 | Takehana | ............... B22D 18/02 428/293.1 |
| 8,960,072 B2 | * | 2/2015 | Suto | ............... F16J 1/01 29/888.048 |

FOREIGN PATENT DOCUMENTS

| | | | | |
|---|---|---|---|---|
| JP | S61294159 | * | 12/1986 | ............... F02F 3/00 |
| JP | 11-267929 A | | 10/1999 | |
| JP | 2001-041100 A | | 2/2001 | |
| JP | 2008-081839 A | | 4/2008 | |
| JP | 2012-122445 A | | 6/2012 | |
| JP | 2012122445 | * | 6/2012 | ............... F02B 23/00 |
| JP | 2012-136958 A | | 7/2012 | |
| JP | 2012136958 | * | 7/2012 | ............... F02F 3/00 |
| JP | 2015-206104 A | | 11/2015 | |

OTHER PUBLICATIONS

Extended European Search Report dated Nov. 28, 2018 for European Patent Application No. 17738319.7.

* cited by examiner

PISTON FOR INTERNAL COMBUSTION ENGINES AND METHOD FOR PRODUCING PISTON FOR INTERNAL COMBUSTION ENGINES

TECHNICAL FIELD

The present disclosure relates to an internal-combustion-engine piston and to a method for producing the internal-combustion-engine piston.

BACKGROUND ART

Traditionally, there has been a known technique to form a thermal barrier film on a member forming the wall surface of combustion chamber of an internal combustion engine.

For example, Patent Literature (hereinafter, referred to as "PTL") 1 discloses a technique to form an anodized aluminum coating on the top face of a base material formed from aluminum or an aluminum alloy. Formation of the anodized aluminum coating enhances the thermal barrier characteristics of the internal-combustion-engine piston, thus making it possible to improve the thermal efficiency of the internal combustion engine.

There has also been a piston in which a recessed combustion chamber is formed in the top face of a base material, traditionally. In connection with recent increases in engine output, there has been a problem in that the mechanical load on a piston is increased and a crack may be caused at the mouth rim portion of a combustion chamber, and accordingly, the durability decreases.

For example, PTL 2 discloses a technique to form a composite material portion at the mouth rim portion to increase the mechanical strength of the mouth rim portion of the combustion chamber.

CITATION LIST

Patent Literature

PTL 1
  Japanese Patent Application Laid-Open No. H11-267929
PTL 2
  Japanese Patent Application Laid-Open No. 2001-41100

SUMMARY OF INVENTION

Technical Problem

As described above, an internal-combustion-engine piston is required to have high thermal barrier characteristics and high durability.

An object of the present disclosure is to provide an internal-combustion-engine piston making it possible to achieve high thermal barrier characteristics and high durability, and a method for producing the internal-combustion-engine piston.

Solution to Problem

An internal-combustion-engine piston according to the present disclosure includes: a base material formed from aluminum or an aluminum alloy; a composite material portion formed in a first region of a surface of the base material from a composite material reinforced by an inorganic fiber or a whisker; and an anodized aluminum coating formed on the composite material portion and in a second region of the surface of the base material, the second region being different from the first region.

Additionally, a method for producing an internal-combustion-engine piston according to the present disclosure includes: forming a base material from aluminum or an aluminum alloy; forming a composite material portion in a first region of a surface of the base material from a composite material reinforced by an inorganic fiber or a whisker; and forming an anodized aluminum coating on the composite material portion and in a second region of the surface of the base material, the second region being different from the first region.

Advantageous Effects of Invention

According to the present disclosure, it is possible to achieve high thermal barrier characteristics and high durability.

DESCRIPTION OF EMBODIMENTS

Hereinafter, embodiments of the present disclosure will be described with reference to the accompanying drawings.

Figure 1:
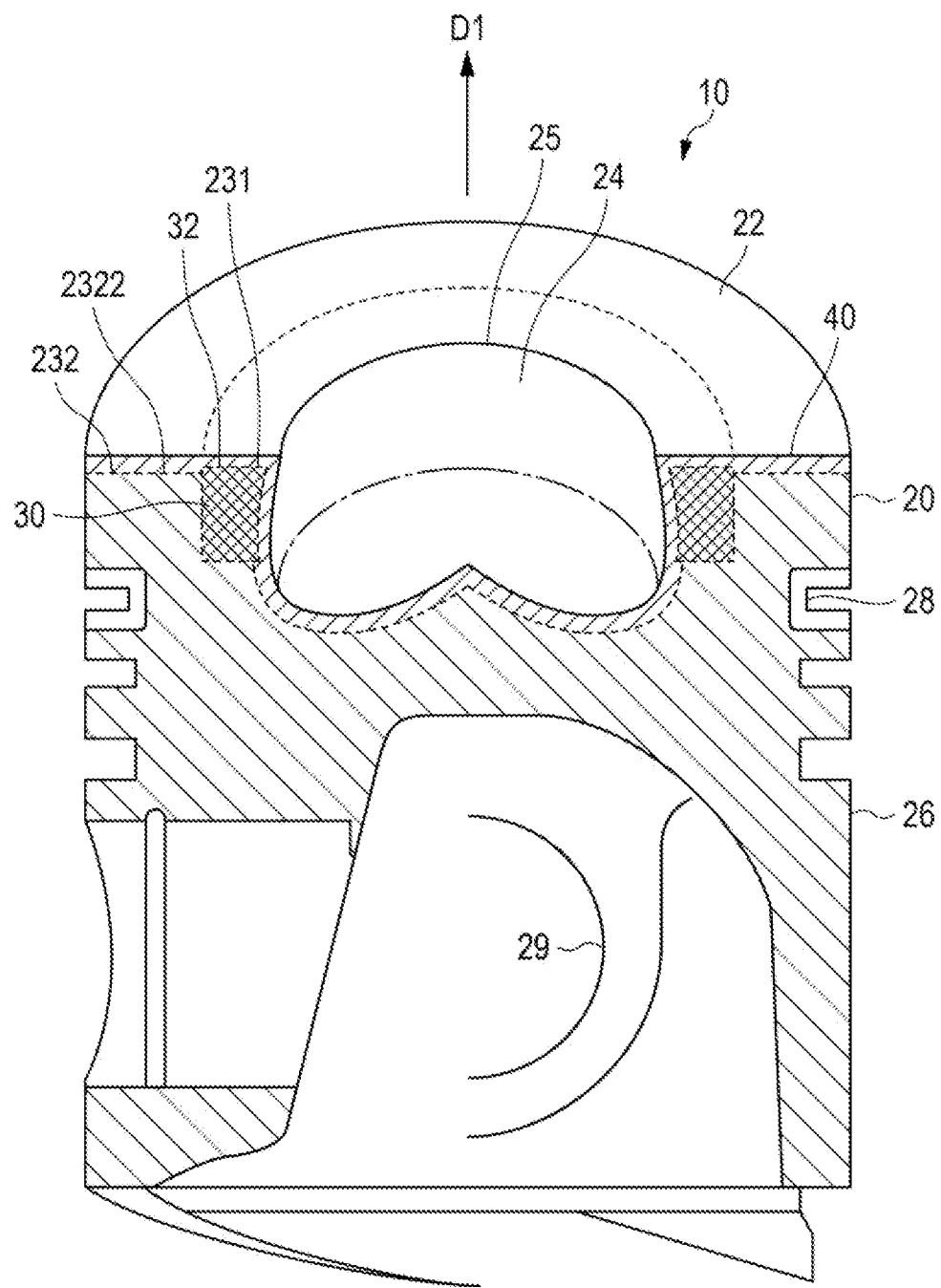
FIG. 1 is a sectional side view illustrating a configuration of an internal-combustion-engine piston according to embodiments of the present disclosure.
Figure 2:
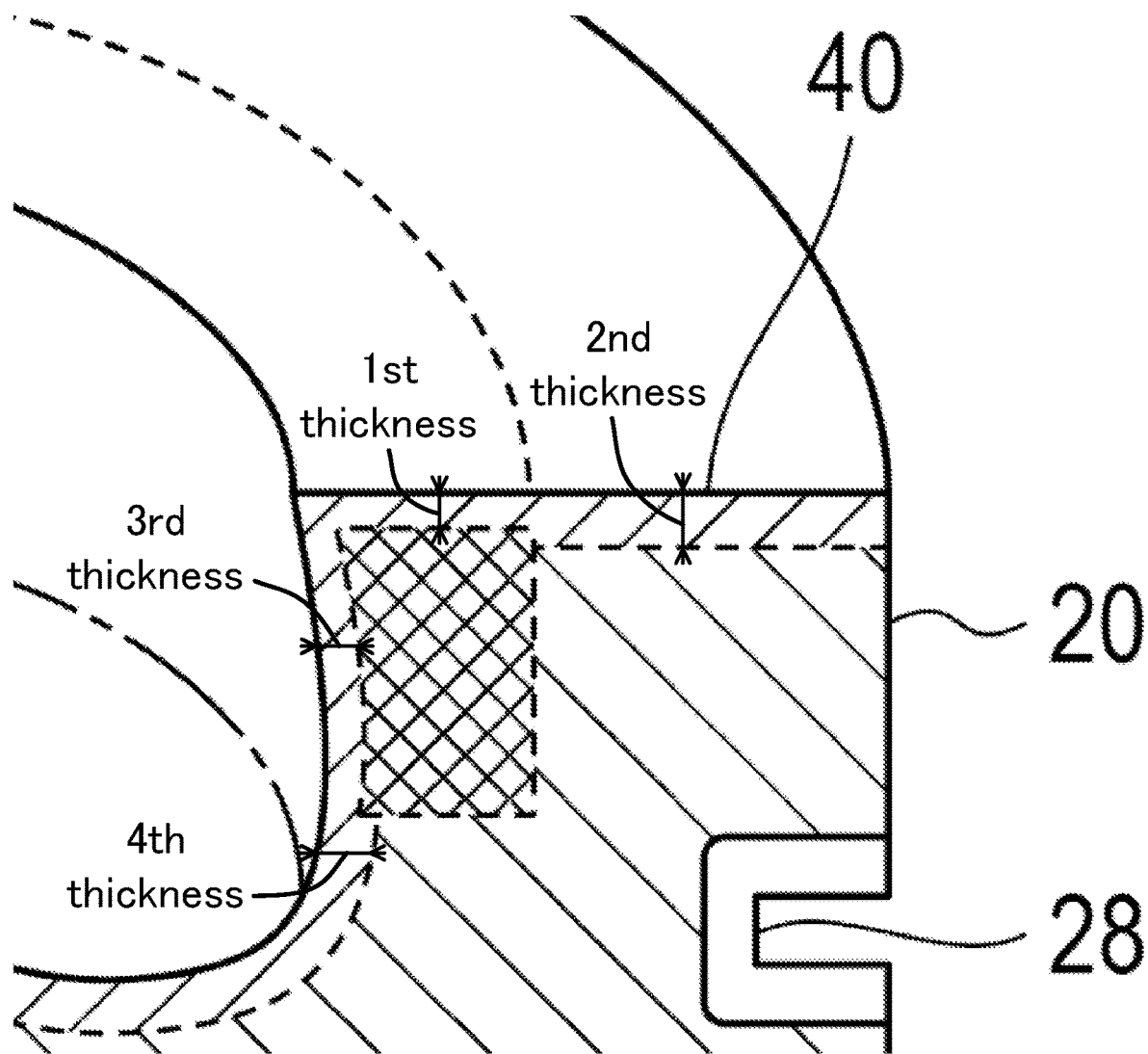
FIGS. 2 and 3 are enlarged views around a composite material portion of the internal-combustion-engine piston illustrated in FIG. 1.
Figure 3:
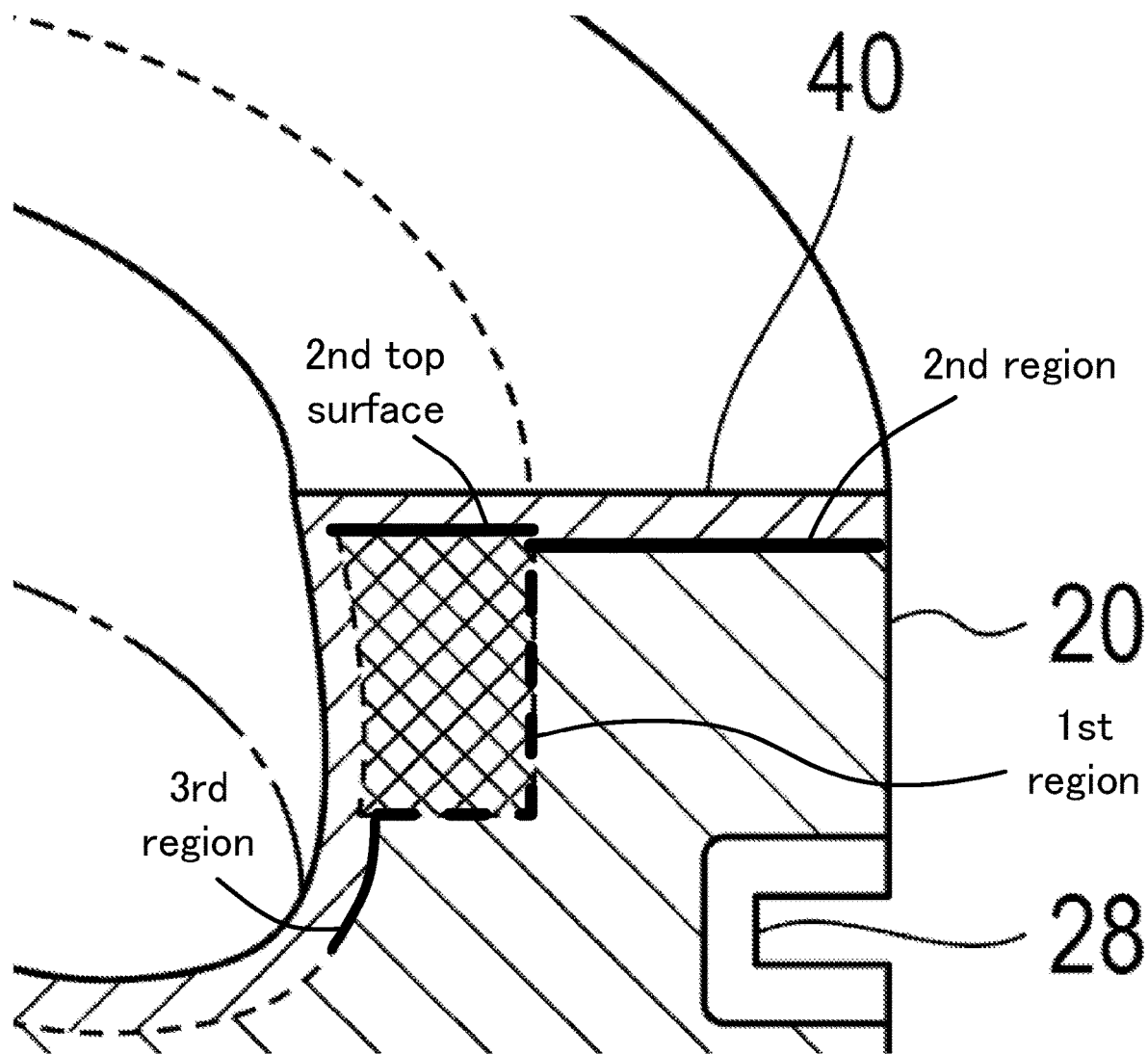

FIG. 1 is a sectional side view illustrating a configuration of internal-combustion-engine piston 10.

As illustrated in FIG. 1, internal-combustion-engine piston 10 includes base material 20, composite material portion 30, and anodized aluminum coating 40.

Base material 20 is formed from aluminum or an aluminum alloy. Recessed combustion chamber 24 is formed at the center of top face 22 of base material 20. Ring grooves 28 for a piston ring are formed in peripheral wall 26 of base material 20. Moreover, through hole 29 (piston hole) for a piston pin (not illustrated) is formed in peripheral wall 26 of base material 20.

Composite material portion 30 is formed over the entire circumference of mouth rim portion 25 of combustion chamber 24. Note that, at top face 22, the region in which mouth rim portion 25 is formed may be referred to as "first region" and the part other than the first region may be referred to as "second region." Note that, the direction orthogonal to the surface of composite material portion 30 may be referred to as "height direction" and, similarly, the direction orthogonal to the surface in the second region may be referred to as "height direction." Moreover, an example of the height direction is indicated by "D1" in FIG. 1.

Composite material portion 30 is formed from a composite material including inorganic fibers or whiskers as reinforcing material.

The inorganic fibers may be of any kind which has a high mechanical strength against thermal stress, and examples of the inorganic fibers to be used include glass fibers, carbon fibers, silicon carbide fibers, silicon nitride fibers, alumina fibers, zirconia fibers, and potassium titanate fibers. Additionally, it is more preferable that the inorganic fibers have high thermal barrier characteristics as a thermal barrier material. Examples of the whiskers to be used include whiskers made of silicon carbide, alumina, boric acid aluminum, silicon nitride, potassium titanate, and/or the like.

Composite material portion 30 is formed by disposing, at a position corresponding to first region 231 in a mold (not illustrated), a preform made from the aforementioned fibers or whiskers, or a porous ceramic consisting of aluminum borate whiskers obtained by direct calcination of ceramic powder; and then, by impregnating the preform or the porous ceramic with molten aluminum by pressure casting, such as squeeze casting, die casting, or the like.

Composite material portion 30 is formed, for example, by publicly known techniques disclosed in Japanese Patent Application Laid-Open No. 2012-136958, such as a mixing method in which particles are mixed directly in a molten aluminum alloy, a reaction method in which powder of a metal oxide is added to a molten aluminum alloy to generate alumina particles in situ, an impregnating method in which a particle preform is impregnated with a molten aluminum alloy by pressure, and/or the like.

Composite material portion 30 is disposed at the position corresponding to first region 231 in the mold (not illustrated). Next, a molten material of base material 20 is injected into the mold. In this way, a cast product in which composite material portion 30 is embedded in first region 231 of base material 20 is obtained.

Surface 2322 in second region 232 is lower in height direction D1 than surface 32 of composite material portion 30 formed in first region 231. Note that, the height of surface 2322 in second region 232 is achieved, for example, by scraping off a portion of the cast product corresponding to surface 2322 by machining.

Hereinbelow, the reason why surface 2322 in second region 232 is made lower than surface 32 of composite material portion 30 will be described.

The anodization rate of part of anodized aluminum coating 40 formed on composite material portion 30 is slower than the anodization rate of part of anodized aluminum coating 40 formed in second region 232. There is thus a difference in anodization rate of anodized aluminum coating 40. Accordingly, when surface 32 of composite material portion 30 and surface 2322 in second region 232 are at the same position in height direction D1, the surface of part of anodized aluminum coating 40 formed on surface 32 of composite material portion 30 is lower than the surface of part of anodized aluminum coating 40 formed in second region 232 and, accordingly, a step is produced between both of the surfaces. Thus, in order to avoid producing the step, before formation of anodized aluminum coating 40, surface 2322 in second region 232 is made lower than surface 32 of composite material portion 30 in advance by the difference in anodization rate.

Note that, although the difference in anodization rate is varied depending on the materials of composite material portion 30 and anodized aluminum coating 40, depending on the time in which anodized aluminum coating 40 is grown, and/or the like, it is possible to specify the difference based on rule of thumb. That is, surface 2322 in second region 232 is made lower than surface 32 of composite material portion 30 in height direction D1 according to the difference in anodization rate specified based on the material of composite material portion 30 and/or the like.

Anodized aluminum coating 40 is formed on composite material portion 30 which is formed in first region 231, and anodized aluminum coating 40 is also formed in second region 232.

Anodized aluminum coating 40 is formed, for example, by the publicly known technique, anodic oxidation treatment, as disclosed in Japanese Patent Application Laid-Open No. 2012-122445.

Since surface 2322 in second region 232 is made lower than surface 32 of composite material portion 30 in advance by the difference in anodization rate, both of the surface of part of anodized aluminum coating 40 formed on composite material portion 30 and the surface of part of anodized aluminum coating 40 formed in second region 232 come to the same position in height direction D1 when anodized aluminum coating 40 is formed on composite material portion 30 and in second region 232.

According to internal-combustion-engine piston 10 according to the embodiments of the present invention, composite material portion 30 formed from the composite material reinforced by the inorganic fibers or the whiskers is formed over the entire circumference of mouth rim portion 25 of combustion chamber 24, and anodized aluminum coating 40 is formed on the composite material portion 30. It is thus made possible to achieve high thermal barrier characteristics and high durability.

Additionally, surface 2322 in second region 232 of top face 22 of base material 20 is made lower in height direction D1 than surface 32 of composite material portion 30 disposed in first region 231. Accordingly, both of the surface of part of anodized aluminum coating 40 formed on composite material portion 30 and the surface of part of anodized aluminum coating 40 formed in second region 232 come to the same position in height direction D1.

Note that, although the above embodiment has been described in relation to the case where first region 231 in which composite material portion 30 is formed corresponds to the entire circumference of mouth rim portion 25 of combustion chamber 24 at top face 22 of base material 20, the present disclosure is not limited to this embodiment, and first region 231 may also be a part of the entire circumference of mouth rim portion 25.

Note also that, although the above embodiment has been described in relation to the case where first region 231 is located at top face 22 of base material 20, the present disclosure is not limited to this embodiment, and first region 231 may be any region of the surface of base material 20 for which the mechanical strength is required to be increased. Composite material portion 30 is formed in such first region 231 and, then, anodized aluminum coating 40 is further formed in first region 231, so that high thermal barrier characteristics and high durability are achieved.

Moreover, although the above embodiment has been described in relation to internal-combustion-engine piston 10 in which composite material portion 30 is formed in mouth rim portion 25 of combustion chamber 24 and anodized aluminum coating 40 is formed on composite material portion 30, the present disclosure is not limited to this embodiment and is also applicable to an internal-combustion-engine piston which does not include combustion chamber 24.

This application is based on the Japan Patent Application No. 2016-003509, filed on Jan. 12, 2016, the disclosure of which is incorporated herein by reference in its entirety.

INDUSTRIAL APPLICABILITY

The present disclosure is useful for an internal-combustion-engine piston making it possible to achieve high thermal barrier characteristics and high durability, and a method for producing the internal-combustion-engine piston.

REFERENCE SIGNS LIST

10 Internal-combustion-engine piston
20 Base material
22 Top face
231 First region
232 Second region
2322 Surface
24 Combustion chamber
25 Mouth rim portion
26 Peripheral wall
28 Ring groove
29 Piston hole
30 Composite material portion
32 Surface
40 Anodized aluminum coating
D1 Height direction

The invention claimed is:

1. An internal-combustion-engine piston, comprising:
 a base material formed from aluminum or an aluminum alloy and having a top surface that includes a first region, a second region, and a third region;
 a composite material portion formed from a composite material reinforced by an inorganic fiber or a whisker and provided on the first region of the top surface of the base material; and
 an anodized aluminum coating formed on a top surface and a radially innermost side surface of the composite material portion, the second region of the top surface of the base material, and the third region of the top surface of the base material, wherein:
 prior to the anodized aluminum coating being formed on the top surface and the radially innermost side surface of the composite material portion, the second region of the top surface of the base material, and the third region of the top surface of the base material:
  the second region of the top surface of the base material is set to be lower than the top surface of the composite material portion by a height difference in a vertical direction with respect to the second region of the top surface of the base material and the top surface of the composite material portion, and
  the third region of the top surface of the base material is set to be further recessed than the radially innermost side surface of the composite material portion by a radial difference in a perpendicular direction to the third region of the top surface of the base material and the radially innermost side surface of the composite material portion, wherein
 the height difference is determined based on a difference in anodization rate of the anodized aluminum coating on the top surface of the composite material portion and the second region of the top surface of the base material,
 the radial difference is determined based on a difference in anodization rate of the anodized aluminum coating on the radially innermost side surface of the composite material portion and the third region of the top surface of the base material, and such that when the anodized aluminum coating is formed on the top surface of the composite material portion and the second region of the top surface of the base material, a first thickness of the anodized aluminum coating formed on the top surface of the composite material portion is smaller than a second thickness of the anodized aluminum coating formed on the second region of the top surface of the base material by the height difference.

2. The internal-combustion-engine piston according to claim 1,
 wherein a part of the anodized aluminum coating formed on the second region of the top surface of the base material includes a top surface at a same position in the vertical direction as a top surface of a part of the anodized aluminum coating formed on the top surface of the composite material portion.

3. A method for producing an internal-combustion-engine piston, the method comprising:
 forming a base material from aluminum or an aluminum alloy, the base material having a top surface that includes a first region, a second region, and a third region;
 forming a composite material portion from a composite material reinforced by an inorganic fiber or a whisker on the first region of the top surface of the base material;
 prior to an anodized aluminum coating being formed on a top surface and a radially innermost side surface of the composite material portion, the second region of the to surface of the base material, and the third region of the top surface of the base material:
  processing the second region of the top surface of the base material so that the second region of the top surface of the base material is lower than a top surface of the composite material portion by a height difference in a vertical direction with respect to the second region of the top surface of the base material and the top surface of the composite material portion, and
  processing the third region of the top surface of the base material so that the third region of the top surface of the base material is further recessed than the radially innermost side surface of the composite material portion by a radial difference in a perpendicular direction to the third region of the top surface of the base material and the radially innermost side surface of the composite material portion; and
 forming the anodized aluminum coating on the top surface and the radially innermost side surface of the composite material portion, the second region of the top surface of the base material, and the third region of the top surface of the base material, wherein:
 the height difference is determined based on a difference in anodization rate of the anodized aluminum coating on the top surface of the composite material portion and the second region of the top surface of the base material;
 the radial difference is determined based on a difference in anodization rate of the anodized aluminum coating on the radially innermost side surface of the composite material portion and the third region of the top surface of the base material; and
 a first thickness of the anodized aluminum coating formed on the top surface of the composite material portion is smaller than a second thickness of the anodized aluminum coating formed on the second region of the top surface of the base material by the height difference.

4. The internal-combustion-engine piston according to claim 1,
 wherein a third thickness of the anodized aluminum coating formed on the radially innermost side surface of the composite material portion is smaller than a fourth thickness of the anodized aluminum coating formed on the third region of the top surface of the base material by the radial difference.

5. The internal-combustion-engine piston according to claim 1,
wherein a part of the anodized aluminum coating formed on the third region of the top surface of the base material includes a radially innermost side surface at a same position in the perpendicular direction as a radially innermost side surface of a part of the anodized aluminum coating formed on the radially innermost side surface of the composite material portion.

6. An internal-combustion-engine piston, comprising:
a base material formed from aluminum or an aluminum alloy, having a top surface that includes a first region and a second region;
a composite material portion formed from a composite material reinforced by an inorganic fiber or a whisker and provided on the first region of the top surface of the base material; and
an anodized aluminum coating formed on a top surface of the composite material portion and the second region of the top surface of the base material, wherein:
prior to the anodized aluminum coating being formed on the top surface of the composite material portion and the second region of the top surface of the base materiel,
the second region of the top surface of the base material is set to be lower than the top surface of the composite material portion by a height difference in a height direction that is perpendicular to a radial direction of the piston;
the height difference is determined based on a difference in anodization rate of the anodized aluminum coating on the top surface of the composite material portion and the second region of the top surface of the base material; and
a first thickness of the anodized aluminum coating formed on the top surface of the composite material portion is smaller than a second thickness of the anodized aluminum coating formed on the second region of the top surface of the base material by the height difference.

7. The internal-combustion-engine piston according to claim 6,
wherein the height direction is perpendicular to the top surface of the composite material portion and the second region of the top surface of the base material.

8. The internal-combustion-engine piston according to claim 6, wherein:
the first region of the top surface of the base material and the second region of the top surface of the base material are adjacent to each other; and
a part of the anodized aluminum coating that is continuously formed on the top surface of the composite material portion and the second region of the top surface of the base material includes an even top surface.

* * * * *